United States Patent [19]

Courty et al.

[11] 4,029,738
[45] June 14, 1977

[54] DECOMPOSING NITROGEN OXIDES WITH NICKEL-IRON-CHROMIUM CATALYSTS

[75] Inventors: Philippe Courty, Nanterre; André Sugier, Rueil-Malmaison; Bernard Raynal, Le Pecq; Georges Berrebi, Massy, all of France

[73] Assignee: Societe Francaise des Produits pour Catalyse, Rueil-Malmaison, France

[22] Filed: Nov. 18, 1974

[21] Appl. No.: 524,880

Related U.S. Application Data

[63] Continuation of Ser. No. 245,771, April 20, 1972, abandoned.

[30] Foreign Application Priority Data

Dec. 2, 1971 France .............................. 71.43394

[52] U.S. Cl. ........................... 423/213.2; 423/239; 423/213.5; 252/470
[51] Int. Cl.² ......................................... B01D 53/00
[58] Field of Search ......... 423/213.2, 213.5, 213.7, 423/239; 252/465, 470

[56] References Cited

UNITED STATES PATENTS

| | | | |
|---|---|---|---|
| 2,658,858 | 11/1953 | Lang et al. | 252/465 |
| 3,216,954 | 11/1965 | Howk et al. | 423/213.2 |
| 3,370,914 | 2/1968 | Gross et al. | 423/213.2 X |
| 3,444,099 | 5/1969 | Taylor | 423/213.2 X |
| 3,699,906 | 6/1972 | Koberstein | 423/213.2 |
| 3,849,538 | 11/1974 | Campbell et al. | 423/213.5 |
| 3,928,534 | 12/1975 | Koberstein | 423/213.2 |

FOREIGN PATENTS OR APPLICATIONS

| | | | |
|---|---|---|---|
| 1,578,433 | 8/1969 | France | 252/465 |
| 1,812,813 | 12/1970 | Germany | 252/470 |

*Primary Examiner*—O. R. Vertiz
*Assistant Examiner*—Brian E. Hearn
*Attorney, Agent, or Firm*—Millen & White

[57] ABSTRACT

Catalyst for the decomposition of nitrogen oxides, particularly for use in catalytic exhaust boxes in view of decomposing the nitrogen oxides contained in the exhaust gases from internal combustion engines, comprising, deposited on a carrier, from 3 to 20% of an active phase of the formula $Ni_x(Fe_yCr_z)O_t$, in which $x$ has a value from 0.5 to 1.5, $y + z$ a value from 1.5 to 3, the ratio $$\frac{y}{y+z}$$

a value from 0.01 to 0.9 and $t$ a value lower than 10.

13 Claims, No Drawings

DECOMPOSING NITROGEN OXIDES WITH NICKEL-IRON-CHROMIUM CATALYSTS

This is a continuation of application Ser. No. 245,771 filed Apr. 20, 1972, now abandoned.

This invention relates to an improved process for the decomposition of nitrogen oxides contained in gaseous mixtures, particularly in the exhaust gases from internal combustion engines.

It also relates to the catalysts used in this process.

In order to reduce the nitrogen oxides content of the exhaust gases of the internal combustion engines, it has been considered to catalytically reduce them to molecular nitrogen. As a matter of fact, the exhaust gases essentially contain steam, carbon dioxide, hydrogen, unburnt hydrocarbons, carbon monoxide and nitrogen oxides. It is therefore possible to catalytically reduce the nitrogen oxides by means of carbon monoxide and/or hydrogen which are present in the exhaust gases. This catalytic reduction raises different problems :

1. The exhaust gases being produced at high temperatures (up to 1,000° C) the catalyst will be subjected to high temperature peaks (up to about 800° C). Its activity will tend to decrease due to the sintering of the carrier and/or of the active element and particularly due to the formation of catalytically inactive combinations between these active elements and the carrier.

2. The reduction of the nitrogen oxides may result in the formation of gaseous ammonia. The latter, subsequently contacted with the oxidizing medium, is liable to be again oxidized, thus forming again nitrogen oxides with a high yield.

Among the catalytic masses suggested for this reaction, there can be mentioned certain binary oxides formed between a metal from group VI A (for example chromium) and a metal from group VIII (for example nickel or iron).

However, the chromium-nickel catalysts do not convert much of the nitrogen oxides to ammonia and if their initial activity is good, the latter tends to decrease substantially during time. On the contrary, the catalysts of the iron-chromium type, whose initial activity is high and does not decrease much during time, convert the most part of the nitrogen oxides to ammonia.

Moreover, these systems, begin to exhibit a substantial activity only at relatively high temperatures (of about 500° to 700° C). It is an object of this invention to provide an improved process for the decomposition of nitrogen oxides so as to efficiently convert the latter to molecular nitrogen.

It is another object of the invention to provide new catalysts for the decomposition of nitrogen oxides, exhibiting a high initial activity which does not quickly decrease during time and a very good selectivity for the conversion to molecular nitrogen.

Other objects and advantages of the invention will appear from the following description.

The process of the invention can be used generally for the decomposition of nitrogen oxides contained in gaseous mixtures together with at least one reducing gas such as, for example, hydrogen or carbon monoxide.

It can be used satisfactorily for the treatment of exhaust gases from internal combustion engines.

The process of the invention generally consists of passing the gaseous mixture to be treated over a catalyst comprising, deposited on a carrier, at least the three following metal elements : nickel, iron and chromium.

More particularly, the catalyst is formed of a carrier on which is deposited an active phase consisting mainly of a compound of the three above-mentioned elements having the formula $Ni_x(Fe_yCr_z)O_t$ in which $x$ is 0.5 to 1.5, the sum of $y$ and $z$ has a value from 1.5 to 3, the ratio of $y$ to $(y + z)$ a value from 0.01:1 to 0.9:1 and in which $t$ has a value lower than 10, said active phase amounting generally to from 3 to 20 % and more particularly from 6 to 15 % by weight of the final catalyst.

The preferred catalysts according to the invention are those whose active phase defined as hereabove, has such a composition that in the formula $Ni_x(Fe_yCr_z)O_t$, $x$ has a value from 0.85 to 1.30, the sum of $y$ and $z$ has a value from 1.8 to 2.3, the ratio of $y$ to $(y + z)$ then being from 0.02:1 to 0.6:1, and $t$ having a value from 2 to 6.

In the hereabove defined compound $Ni_x(Fe_yCr_z)O_t$, it is possible to replace $Ni_x$ with $A_x$ which is defined as at least 50% Ni atoms and up to 50% and, preferably, up to 30% of atoms of at least one element M selected from magnesium, calcium, manganese, copper, zinc, cobalt and iron. It is also possible to replace $(Fe_yCr_z)$ with $(B_yE_z)$ which is defined as at least 50% of the totality as Fe and Cr atoms and up to 50% and, preferably, up to 40 % of the totality of the iron and chromium atoms as atoms of at least one element N selected from aluminum, manganese, vanadium, scandium, yttrium and the elements having atomic numbers from 57 to 71 inclusive (rare earth metals).

As carriers for these catalysts, it is possible to use, according to the invention, for example, alumina, silica, alumina-silica, zirconia, thoria, magnesium aluminate or still silicon carbide, the preferred carriers consisting mainly of alumina and optionally containing small amounts of silica and/or alumino-silicate.

The carriers have preferably a specific surface lower than 100 m²/g, advantageously lower than 80 m²/g and more preferably lower than 30 m²/g; as examples of carriers there can be mentioned alumina carriers having as trade references TF, TN, SRS 5, SRS 6, SCS 10, SRS 30/60 and SCS 59. However, it is not excluded to make also use of carriers having a higher specific surface, such as for example, the carriers having the trade references SCS 250–300, SCS 350, SCM 250–300 and SCBM 250–300.

The carriers, according to this invention, which consist mainly of alumina, may also contain at least one oxide of at least one element, named Z, selected from magnesium, calcium, barium and lithium, in a proportion generally lower than 10 % by weight. This oxide acts as texture stabilizing agent, additive, activator, structure stabilizing agent or cocatalyst. It may be incorporated to the carrier during its manufacture or can be added thereafter, for example by impregnation.

It is particularly advantageous that the catalyst have a high homogeneity and that the active phase, on the carrier, be in a highly dispersed state.

The homogeneity, which can be determined by the microsonde of CASTAING, is preferably such that fluctuations of the atomic ratios between the elements which constitute the carrier and the active phase of the catalyst, measured at the micron scale, be kept for example, lower than 10 %.

Moreover, the catalysts according to the invention have, preferably, a specific surface at least equal to that of their carrier when calcinated under the same conditions as the final catalyst.

The carriers which are used, can be, for example, in the form of particles of sizes smaller than 10 mm (spherical or cylindrical grains, for example).

They may also be in the form of a cellular block, these cellular blocks may be formed from balls of a carrier "precursor", welded together, or they additionally can be obtained by injection of a "precursor" paste of the carrier, into a press, provided with punches for making the voids (cells) of the block. For this purpose, there is used, for example, a so-called "BUSSMANN" press, the use of which is common in the ceramics industry.

These cellular blocks may have the internal shape of the catalytic system in which they are placed. In this case, they may consist either of a single mass (generally cylindrical), or of several joined cylindrical sectors, or of disks (for example of a thickness from 5 to 150 mm), joined together by means of a suitable device.

For manufacturing the catalysts, the active phase may be deposited on the carrier, for example, by impregnation or by mixing.

When operating by impregnation, there can be used one or more aqueous solutions containing soluble compounds of the elements to be associated, Ni, Fe, and Cr and optionally of at least one of the previously mentioned elements, for example, M, X and Z, the operation being conducted in one or more steps.

In order to obtain a good homogeneity and a good dispersion of the active phase, it is advantageous to add to the solution, or solutions, of impregnation :

at least one complexing compound such as polycarboxylic acid (for example oxalic acid or one of its salts), an hydroxy-acid (for example citric, malic, lactic, tartaric and glycolic acids or their salts) a ketoacid (for example pyruvic acid), an aminoacid (for example glycine or alanine), an aminoalcohol (for example mono, di or tri-ethanolamine, or their aminoammonium salts), a polyalcohol (for example, mono, di, tri and polyethylene-glycols or polyvinyl alcohol) or a polyose (for example, glucose, saccharose or starch);

and/or at least one jellifying substance such as a gum (for example Senegal gum, tragacanth gum, Carob gum or Dammhar gum), an alkylcellulose (for example, methycellulose, ethycellulose or carboxymethycellulose) or still propylene oxide, polypropylene oxide or polyethylene oxide.

Similarly, it can be advantageous to use all or a part of one of the metal elements, iron for example, in the form of a chemical combination with one of the above-mentioned substances, such for example as iron citrate, iron ammonium oxalate, or a solution containing a salt or an iron hydroxide, or elemental iron with at least one compound such as for example, citric acid, malic acid, glycolic acid, lactic acid, tartaric acid, an alkaloamine or a salt of alkalonamineammonium, ethylene glycol, diethylene glycol, triethylene glycol, polyethylene glycols and glycerol.

After impregnation with one or more solutions, the carrier is dried, for example at a temperature from 80° to 250° C, during a time sufficient for avoiding any loss of mechanical strength during the further thermal activation.

The thermal activation of the catalyst is carried out, for example, by heating during more than 30 minutes, at a temperature of from 500° to 800° C, in the presence of a gas which may be air, oxygen, nitrogen, hydrogen or a mixture of nitrogen with hydrogen. It is also possible to operate in the presence of steam. The thermal activation may be conducted, under the above-defined conditions, directly in the device in which the catalyst is used, for example, in the device for the treatment of the exhaust gases (catalytic exhaust box, for example).

The catalysts according to the invention, exhibit a good mechanical strength and a good resistance to abrasion and attrition phenomena.

When used in the process for decomposing nitrogen oxides, particularly in the exhaust gases from internal combustion engines, according to the invention, the catalysts as above described are generally used in a fixed bed in a suitable device (catalytic exhaust box).

The gaseous mixture to be treated generally passes through the catalyst bed at a hourly volume rate which corresponds under normal conditions of temperature and pressure, to 20,000 to 60,000 volumes of gas per volume of catalyst and per hour.

In the normal operating conditions of the catalyst composition, the temperatures of the catalyst bed may vary, for example from about 200° to about 800° C. More particularly, when the vehicle is in its starting period, the initial temperatures in the catalysts bed are relatively low (from about 200° to 500° C).

In view of improving the efficiency of use of the catalyst, it may be advantageous to operate the engine under conditions as close as possible to the stoichiometry of the combustion reaction of the fuel, a light excess of fuel being however maintained, so that the content of carbon monoxide in the exhaust gases is not lower than about 1.5 % by volume, so as to make possible the decrease of the fuel consumption and finally the reduction of the content of carbon monoxide and unburnt hydrocarbons in the exhaust gases.

The excellent stability of the catalysts used in the process of the invention not only results in an efficient reduction of the nitrogen oxides content in the exhaust gases from an engine operated under the optimal conditions as above stated, but also makes them more resistant to the successive passages in reducing and oxidizing atmosphere which happen during the stopping, starting and casual changes of the running conditions of the vehicle.

Moreover, these catalysts also exhibit a substantial catalytic activity in the reaction of conversion with steam of carbon monoxide and hydrocarbons. They have also a good activity in the reactions of oxidation of hydrocarbons and carbon monoxide. These reactions, due to their exothermicity, result in a very high increase of the catalyst bed temperature.

Generally the catalyst, such as above defined, constitutes the entirety of the catalyst bed contained in the catalytic exhaust box of the vehicle.

However, it may constitute only a portion, for example 80 % by weight, of the catalyst bed, which may further comprise:

particles of diluent used for reducing the attrition and/or improving the thermal exchanges, up to 15 % by weight of a catalyst for oxidizing hydrocarbons and carbon monoxides, as, for example, a palladium catalyst, and up to 10 % by weight of a catalyst for the decomposition of ammonia such, for example, as a catalyst with a ruthenium and/or palladium base.

According to an improved embodiment of the process of the invention, it has been discovered that it might be advantageous to make use of a catalyst such as defined above but further containing at least one additional compound of a metal selected from ruthenium, rhodium, palladium, osmium, iridium and platinum, in a total amount of from 1 to 10,000 parts by weight per million of parts by weight of final catalyst.

A preferred total content is from 10 to 1000 parts by weight per million of parts.

Surprisingly, the presence in the catalyst of one or more of these metal elements has the effect of lowering the minimal "effective temperature" of the catalyst, this being particularly interesting when the engine whose exhaust gases are treated is running at low or mean speed.

These additional metal elements may be added to the catalyst either before, during or after the deposit of the other constituents of the active phase on the carrier.

They may, in particular, be deposited after calcination of the catalyst, by impregnation or mixing. When operating by impregnation, there can be used any soluble salt of one or more of the elements to be added. It is also possible to add to the impregnating solution at least one of the complexing compounds and/or at least one of the jellifying substances hereabove mentioned. The preparation is otherwise conducted as above described.

The following examples illustrate the invention but are not limitative thereof. Examples 21 and 22 are given by way of comparison.

First of all there are described the carriers and the solutions used for the manufacture of the catalysts.

The carrier used for manufacturing the catalysts described in examples 1, 2, 5, 6, 14, 15, 17 to 20, 23 to 25, 31 and 33 is an aluminous carrier consisting essentially of an α alumina with a low sodium content (less than 1000 ppm of $Na_2O$), having a porous volume of about 45 ml/100 g and a specific surface, measured with a sorbtometer, of about 8 $m^2g^{-1}$. This carrier, hereinafter called SCS 9, has an attrition, measured by the IFP method, of from 2.5 % and crushing values grain to grain, obtained for grains of a size from 3.2 to 4 mm, amounting to 8 to 15 kg (average value of 12.5 kg).

The carrier used in examples 3, 4, 7, 8, 13, 16 21 and 22 is an aluminous carrier, having a porous volume of 35 ml/100 g and a specific surface, measured with a sorbtometer, of 6 $m^2/g$.

It has an attrition, determined by the IFP method, of 0.3 % and crushing values, grain to grain, of from 4.4 to 14 kg (average value of 10.4 kg).

This carrier will hereinafter be referred to as SRS 6.

In examples 10 to 12, there has been used an aluminous carrier having a specific surface of 60 $m^2g^{-1}$, which will hereinafter be referred to as SCS 59.

In example 9, there has been used an alumina-magnesia carrier prepared as indicated below, from an aluminous carrier, referred to as SCMB 250–300, whose characteristics, after thermal activation at 800° C for 3 hours, are as follows :

| | |
|---|---|
| Total porous volume | ~ 67 ml/100 g |
| Porous volume (porosimetry with mercury up to 2 000 bars) | ~ 56.5ml/100g |
| Specific surface measured with a sorbtometer | ~ 153 $m^2g$ |
| Grain specific gravity | ~ 1.03 |
| Structural specific gravity | ~ 3.32 |
| IFP attrition (5 minutes) | ~ 5.8% |

-continued

| | |
|---|---|
| MgO | ~ 0% |

2,000 g of carrier SCMB 250–300 are desorbed at 500° C for 3 hours and thereafter impregnated with 1350 ml of a solution containing 1480 g of magnesium nitrate hexa-hydrate (corresponding to 222 g of magnesia) and 50 ml of nitric acid having a density of 1.38; after drying at 200° C for 48 hours and thermal activation at 800° C for 3 hours, the new carrier, called SCMB-MgO, exhibits the following characteristics :

| | |
|---|---|
| Total porous volume | ~ 55.1 ml/100 g |
| Porous volume (porosimetry with mercury up to 2 000 bars) | ~ 49.3 ml/100 g |
| Specific surface measured with a sorbtometer | ~ 128$m^2/g$ |
| Grain specific gravity | ~ 1.18 |
| Structural specific gravity | ~ 3.37 |
| IFP attrition (5 minutes) | ~ 4.6% |
| MgO | ~ 10% |

When subjecting this carrier to X rays diffraction, it appears that it contains the spinel phase $MgAl_2O_4$.

The carrier used for manufacturing the catalyst of example 30 is an aluminous carrier consisting of the aluminum and magnesium spinel ($MgAl_2O_4$), with a 72 % $Al_2O_3$ content. Its porous volume amounts to about 39 ml/100 g and its specific surface, measured with a sorbtometer is about 30 $m^2g^{-1}$. This carrier, hereinafter called $MgAl_2O_4$, has an attrition, measured by the IFP method, of 0.1 %.

There has also been used the following impregnation solutions :

SOLUTION A

There are successively dissolved in 450 ml of water : 130.4 g of chromic anhydride, 277 g of nickel acetate tetrahydrate; and then the volume of the solution has been extended to 700 ml. After cooling, there are added, under stirring, 203 g of ammoniacal ferric citrate with a 25.3 % $Fe_2O_3$ content. After dissolution, the solution is diluted to 1000 ml.

SOLUTION B

Into 300 ml of water, there are successively added 522g of chromium nitrate nonahydrate (1.30 ion.g $Cr^{3+}$), 259 g of ferric nitrate nonahydrate (0.64 ion g $Fe^{3+}$) and 297 g of nickel nitrate hexahydrate (1.02 mole). The mixture is heated to 60°–80° C so as to melt the nitrates in their crystallization water and, after cooling, the solution is diluted to 1,000 ml.

SOLUTION C

Into 300 ml of water, there are dissolved 163 g of chromic anhydride. Under stirring, 346 g of nickel acetate tetrahydrate are added thereto. The mixture is heated to 50° C up to dissolution and, after cooling, 254 g of ammoniacal ferric citrate, having a 25.3 % $Fe_2O_3$ content, are added thereto. The mixture is heated to 60° C and, after cooling, the solution is diluted to 950 ml by addition of water and of 15 ml of ammonia (density = 0.89).

SOLUTION D 73.5 g of basic nickel carbonate are reacted with a solution of 78.5 g of $CrO_3$ and 60 ml of nitric acid (density of 1.38) in 250 ml of water. After dissolution, there are added 156 g of ferric nitrate nonahydrate, and then 0.4 mole of citric acid monohydrate; the solution is diluted to 470 ml.

SOLUTION E 138 g of chromic anhydride are dissolved in 170 ml of water and this solution is reacted with 94 g of basic nickel carbonate (0.75 ion g Ni). After complete dissolution, there are added 38 g of ammoniacal ferric citrate (0.12 mole) and the solution is diluted to 600 ml.

SOLUTION F 138 g of chromic anhydride are dissolved into 250 ml of water; to this solution are added 94 g of basic nickel carbonate (0.75 $Ni^{2+}$) and thereafter 51.4 g of ammonium ferric oxalate (0.12 mole) and the solution is diluted to 850 ml by water addition.

SOLUTION G 124 g of chromic anhydride (1.24 mole) are dissolved into 150 ml of water. To this solution are added 93.5 g of powdered basic nickel carbonate (0.745 ion g Ni).

After slow digestion and complete dissolution of the basic carbonate, there are added 78 g of ammoniacal ferric citrate (0.246 mole) and the solution is diluted to 600 ml.

SOLUTION H 144g of chromic anhydride (1.44 mole) are dissolved into 170 ml of water. To the resulting solution are added 94 g of basic nickel carbonate (0.75 ion g Ni) and thereafter, after decomposition of the carbonate and dissolution, there are added 19 g of ammoniacal ferric citrate (0.06 mole). The cooled solution is diluted to 600 ml.

SOLUTION I

The preparation of solution A is repeated.
To the 1000 ml of the solution, there are added, under stirring, 31.1 g of cobalt nitrate hexahydrate and 48.7 g of decomposition of the carbonate and dissolution, there are added 19 g of ammoniacal ferric citrate (0.06 mole). The cooled solution is diluted to 600 ml.

SOLUTION I

The preparation of solution A is repeated.
To the 1000 ml of the solution, there are added, under stirring, 31.1 g of cobalt nitrate hexahydrate and 48.7 g of manganese nitrate tetrahydrate. After dissolution, 25 ml of ammonia (d = C.89) are added to the solution which is thereafter diluted to 2 100 ml.

SOLUTION J

Into 400 ml of water there are dissolved 100 g of chromic anhydride and to the resulting solution there are added 94.5 g of basic nickel carbonate containing 63.15% of NiO. After 1 hour at 60° C, under stirring, there are added 70 ml of nitric acid (density = 1.38) and water, and then, after complete dissolution, 51.3 g of magnesium nitrate hexahydrate. The volume is extended to 1,000 ml. After cooling there are slowly added 310 g of ammoniacal ferric citrate and 60 ml of ammonia (d = 0.89). The solution is heated so as to obtain a complete dissolution, and then diluted to 1,500 ml.

SOLUTION K 11.5 g of basic copper carbonate with a 68.9% CuO content are added to a solution of 120 g of chromic anhydride in 300 ml of water. After reaction and complete dissolution, 224 g of nickel acetate tetrahydrate are dissolved therein and 30 ml of ammonia (d = 0.89), 248 g of ammoniacal ferric citrate with a 25.3% content of $Fe_2O_3$ and 500 ml of water, are added thereto. After dissolution of all the constituents, the solution is diluted to 1,720 ml.

SOLUTION L

To a solution of 140 g of chromic anhydride into 300 ml of water, there are successively added 262 g of nickel nitrate hexahydrate, 29.1 g of cobalt nitrate hexahydrate, 75 g of aluminium nitrate nonahydrate and 12.55 g of manganese nitrate tetrahydrate. After dissolution of all the constituents, there are added to the solution, previously diluted to 1,000 ml, 124 g of ammoniacal ferric citrate. The resulting solution is finaly diluted to 1,200 ml.

SOLUTION M

To a solution of 130 g of chromic anhydride in 200 ml of water, there are added 120 ml of acetic acid (d = 1.050) and then 106 g of basic nickel carbonate. Subsequently, there are added to 25.10 g of manganese nitrate tetrahydrate and 200 ml of water. To the resulting solution there is added a solution comprising 216 g of ferric citrate in 100 ml of water, the total solution being then diluted to 950 ml.

SOLUTION N

There are crushed in a mortar 134 g of chromic anhydride and 53 g of nickel carbonate. The resulting product is treated with 200 ml of water and then, after dissolution of all the constituents, there are added 112 g of nickel acetate tetrahydrate, 24.51 g of zinc acetate tetrahydrate and then a solution of 205 g of ferric citrate in 100 ml water. The resulting solution is diluted to 720 ml.

SOLUTION O

There is prepared a solution consisting of 176.2 g of nickel nitrate hexahydrate, 29 g of copper nitrate trihydrate, 35.9 g of chromic anhydride, 91.4 g of manganese nitrate tetrahydrate, 1.55 g of iron citrate with a 25.8% $Fe_2O_3$ content, 100 g of citric acid monohydrate and 120 ml of water. The solution volume is adjusted to 480 ml.

SOLUTION P

To 150 ml of water, there are added 36.3 g of chromic anhydride, 106.7 g of nickel nitrate hexahydrate, 17.64 g of copper nitrate trihydrate, 165.9 g of manganese nitrate tetrahydrate, 1.55 g of iron citrate with a 25.8% $Fe_2O_3$ conent and 150 g of tri-ammonium citrate. The solution is diluted to 470 ml.

SOLUTION Q

To 130 ml of water, there are added 180.9 g of nickel nitrate hexahydrate, 23.2 g of copper nitrate trihydrate, 5 g of chromic anhydride, 72.0 g of manganese nitrate tetrahydrate and then a solution of 119 g of iron citrate with a 25.8% $Fe_2O_3$ content in 100 ml of water. The final solution is diluted to 470 ml.

SOLUTION R

There is prepared a solution comprising 120 ml of water, 119.5 g of nickel nitrate hexahydrate, 19.8 of copper nitrate trihydrate, 16 g of chromic anhydride, 103.2 g of manganese nitrate tetrahydrate and a solution of 76.6 g of iron citrate with a 25.8% $Fe_2O_3$ content in 60 ml of water. The final solution is diluted to 460 ml.

SOLUTION S 6,250 g of chromic anhydride dissolved in 4,000 ml of water are treated with 6,560 g of basic nickel carbonate with a 63.15% NiO content and then with 3,250 ml of nitric acid having a specific gravity of 1.38. After complete dissolution there are added thereto 10,150 g of ferric ammonium citrate with a 25.75% content of $Fe_2O_3$. After the dissolution is achieved, it is diluted to 47 liters.

SOLUTION T 2.22 g of ruthenium tetrachloride with a 41.5% Ru content are dissolved into 830 ml of water; 10 g of citric acid monohydrate are added thereto.

SOLUTION U 4 ml of a commercial solution of palladium chloride containing 24 g of Pd per each 100 ml are diluted with 830 ml of water. 16 ml of hydrochloric acid having a density of 1.19 are added thereto.

SOLUTION V 2.32 g of rhodium cloride, at a concentration of 38.75% of Rh, are dissolved into a solution of 10 g of citric acid monohydrate in 830 ml of water.

SOLUTION W 12 ml of a commercial solution of iridium chloride containing 8 g of Ir per 100 ml are diluted with a solution of 15 g of malic acid in 820 ml of water.

SOLUTION X 117.6 g of chromic anhydride are dissolved into 150 ml of water. There are successively added thereto 36.6 g of nickel acetate, 100 ml of water, 54.8 g of ammoniacal ferric iron citrate with a 25.75% $Fe_2O_3$ content and 4 ml of a commercial solution of palladium chloride containing 24 g of Pd per 100 ml. After complete dissolution, the solution is diluted to 900 ml.

SOLUTION Y 58.4 g of chromic anhydride in 80 ml of water are treated by 363 g of nickel acetate, 100 ml of water and 72.4 g of ammoniacal ferric citrate with a 25.75% content of $Fe_2O_3$. After complete dissolution, the solution is diluted to 1,400 ml.

SOLUTION Z 4.4 ml of a commercial solution of palladium chloride containing 24 g of Pd per 100 ml are diluted with 1,100 ml of water containing 20 ml of hydrochloric acid having a density of 1.19. There is subsequently added 0.36 g of ruthenium tetrachloride with a 41.5% Ru content and 5 g of citric acid monohydrate. The solution is completed to 1,200 ml.

SOLUTION AA 88 g of chromic anhydride in aqueous saturated solution are treated with 36.4 g of nickel acetate and 150 ml of water. There are added 63.6 g of ammoniacal ferric citrate and, after complete dissolution, the solution is diluted to 1,400 ml.

SOLUTION AB 5.6 ml of palladium nitrate commercial solution containing 24 g of Pd per 100 ml are diluted with 25 ml of pure nitric acid (density 1.38) and with 1,200 ml of water.

EXAMPLES 1 to 20

The catalysts of examples 1 to 20 have been prepared by impregnation under the conditions indicated in the following tables I and II.

COMPARATIVE EXAMPLES

There have also been prepared, by way of comparison, catalyst whose active phase only contains two metal elements.

EXAMPLE 21 (iron chromite)

150 g of chromic anhydride dissolved in 150 ml of water are treated with 243 g of ammoniacal ferric citrate and 10 ml of ammonia (d = 0.89). After addition of water up to a volume of 600 ml, the solution is used for impregnating 1,500 g of SRS 6 carrier. The catalyst is dried at 200° C for 10 hours and then activated for 3 hours at 500° C.

EXAMPLE 22 (nickel chromite)

150 g of chromic anhydride, dissolved in 150 ml of water, are treated with 186.5 g of nickel acetate tetrahydrate. The solution is diluted to 460 ml and 1,150 g of the SRS 6 carrier are impregnated therewith. The catalyst is dried for 10 hours at 200° C and activated for 3 hours at 500° C.

TABLE I

| Ex | Mass of the carrier (g) | Desorption T (°C) | Desorption Time (h) | Impregnation Solution | Impregnation Amount (ml) | Impregnation Particular conditions | Drying T (°C) | Drying Time (h) | Thermal decomposit T (°C) | Thermal decomposit Time (h) | Resulting Catalyst Mass (g) | Resulting Catalyst Active phase | Spec. surf % weight | Spec. surf (BET) m²/g |
|---|---|---|---|---|---|---|---|---|---|---|---|---|---|---|
| 1 | 2000 | 500 | 3 | A | 1000 | in 20 minutes | 200 | 12 | 500 | 2 | 2250 | Ni$_{1.15}$ Fe$_{0.66}$ Cr$_{1.34}$ O$_{4.15}$ | 10 | 20 ± 5 |
| 2 | 2000 | 500 | 3 | B | 1000 | — | 200 | 15 | 500 | 2 | 2250 | Ni$_{1.15}$ Fe$_{0.66}$ Cr$_{1.34}$ O$_{4.15}$ | 10 | 9 |
| 3 | 2500 | 500 | 3 | C | 950 | in 40 minutes | 180 220 | 15 | 500 | 2 | 2800 | Ni$_{1.15}$ Fe$_{0.66}$ Cr$_{1.34}$ O$_{4.15}$ | 10 | 23 ± 5 |
| 4 | 1200 | 500 | 3 | D | 470 | — | 200 | 12 | 500 | 3 | 1330 | Ni Fe$_{0.66}$ Cr$_{1.34}$ O$_4$ | 10 | 15 ± 5 |
| 5 | 1200 | 500 | 3 | E | 600 | — | 200 | 12 | 500 | 3 | 1370 | Ni Fe$_{0.16}$ Cr$_{1.84}$ O$_4$ | 12.4 | 16 ± 5 |
| 6 | 1700 | 500 | 3 | F | 850 | — | 180 | 20 | 600 | 3 | 1870 | Ni Fe$_{0.16}$ Cr$_{1.84}$ O$_4$ | 9.1 | — |
| 7 | 1500 | 500 | 2 | G | 600 | — | 200 | 10 | 500 | 2 | 1670 | Ni Fe$_{0.33}$ Cr$_{1.67}$ O$_4$ | 10 | 22 ± 5 |

TABLE I-continued

| Ex. | Mass of the carrier (g) | Desorption T (°C) | Time (h) | Solution | Impregnation Amount (ml) | Particular Conditions | Drying T (°C) | Dur-ee (h) | thermal decomposit T (°C) | Dur-ee (h) | Mass (g) | Resulting catalyst Active phase | Spec. % weight | Surf. (BET m²/g) |
|---|---|---|---|---|---|---|---|---|---|---|---|---|---|---|
| 8 | 1500 | 500 | 3 | H | 600 | — | 150 250 | 10 | 500 | 3 | 1700 | Ni Fe Cr O<br>0.08 1.92 4 | 10 | 18 ± 5 |
| 9 | 2000 | — | — | I | 2100 | In 2 steps with an intermediary drying at 200° C for 12 h. | 200 | 10 | 500 | 2 | 2250 | (Ni Co) (Fe Cr Mn₂ O)<br>1.05 0.1 0.3 0.61 0.09⁴ | 11 | — |
| 10 | 1600 | 500 | 2 | J | 1500 | In 2 steps with an intermediary drying at 200° C for 3 h. | 150 | 10 | 600 | 3 | 1820 | $\begin{pmatrix} Ni & Mg \\ 0.8 & 0.2 \end{pmatrix}_1 \begin{pmatrix} Fe & Cr \\ 0.5 & 0.5 \end{pmatrix}_2 O_4$ | 12.2 | — |
| 11 | 1600 | 500 | 2 | J | 1500 | IN 2 steps intermediary drying for 3h at 200° C | 150 | 10 | Under air<br>900 24 | | | $\begin{pmatrix} Ni & Mg \\ 0.8 & 0.2 \end{pmatrix} \begin{pmatrix} Fe & Cr \\ 0.5 & 0.5 \end{pmatrix}_2 O_4$ | 12.2 | — |
| 12 | 1600 | 500 | 2 | J | 1500 | In 2 steps with intermediary drying for 3h at 200° C | 150 | 10 | Under N₂-H₂<br>(50 – 50)<br>600 4 | | | | | |
| 13 | 2300 | 500 | | K | 1700 | In 2 steps with intermediary drying for 3h at 200° C | 160 | 10 | 550 | 3 | 2530 | $\begin{pmatrix} Ni & Cu \\ 0.9 & 0.1 \end{pmatrix} \begin{pmatrix} Fe & Cr \\ 0.4 & 0.6 \end{pmatrix}_2 O_4$ | 9.1 | — |
| 14 | 1400 | 450 | 3 | L | 1200 | In 2 steps with intermediary drying for 3h at 200° C | 150 220 | 5 8 | 550 | 3 | 1630 | $\begin{pmatrix} Ni & Fe \\ 0.9 & 0.1 \end{pmatrix}$<br>$\begin{pmatrix} Fe & Al & Mn & Co & Cr \\ 0.3 & 0.2 & 0.05 & 0.1 & 1.4 \end{pmatrix} O_4$ | 14 | — |
| 15 | 2100 | 500 | 3 | M | 950 | in 10 minutes | 150 | 3 | 600 | 4 | 2330 | $\begin{pmatrix} Ni & Fe \\ 0.9 & 0.1 \end{pmatrix}$<br>$\begin{pmatrix} Cr & Mn & Fe \\ 0.65 & 0.05 & 0.1 & 1.4 \end{pmatrix} O_4$ * | 9.8 | — |
| 16 | 1900 | 500 | 2 | N | 720 | — | 190 | 4 | 580 | 2 | 2130 | $\begin{pmatrix} Ni & Zn \\ 0.9 & 0.1 \end{pmatrix} \begin{pmatrix} Fe & Cr \\ 0.66 & 1.34 \end{pmatrix} O_4$ | 10.8 | — |

*May also have the structure formula (Ni₀.₉Co₀.₁)(Fe₀.₄Al₀.₂Mn₀.₀₆Cr₁.₄₀) O₄, the variations of the parameter resulting from the replacement of nickel either by iron or by cobalt being not perceptible.

TABLE II

| | | | Impregnation | | Drying | | Thermal decomposition | | | Resulting Catalyst | | | |
|---|---|---|---|---|---|---|---|---|---|---|---|---|---|
| Ex | Carrier | Mass (g) | Solution | Amount (ml) | T° C | Time (h) | T° C | Time (h) | Mass (g) | Active phase | | % weight | Spec. surface (BET) m²g⁻¹ |
| 17 | SCS 9 | 1000 | O | 480 | 200 | 10 | 500 | 2 | 1125 | (Ni₁.₂₅Cu₀.₂₅)(Cr₀.₇₄Mn₀.₇₅Fe₀.₀₁)O₃.₇₅ | | 10 | 20±5 |
| 18 | " | " | P | 470 | 190 | 12 | 480 | 3 | 1128 | (Ni₀.₇₅Cu₀.₁₅Mn₀.₆₀)(Cr₀.₇₄Mn₀.₇₅Fe₀.₀₁)O₃.₇₅ | | 10.2 | 20±5 |
| 19 | " | " | O | 470 | 200 | 8 | 540 | 1 | 1126 | (Ni₁.₃₀Cu₀.₂₀)(Cr₀.₁Mn₀.₆Fe₀.₈)O₃.₇₅ | | 10.1 | 20±5 |
| 20 | " | " | R | 460 | 180 | 10 | 500 | 2 | 1128 | (Ni₁.₃₀Cu₀.₂)(Cr₀.₂Mn₀.₅Fe₀.₃)₂O₄.₅ | | 10.2 | 20±5 |

Some physical characteristics of the catalysts prepared in examples 1 and 3 have been determined and are indicated below:

| | Catalyst 1 | Catalyst 3 |
|---|---|---|
| Specific surface with sorbtometer | 20.4 m²/g | 25 m²/g |
| Porous volume (by a porosimeter) | 36 ml/100 g | 32 ml/100 g |
| Filling density | 0.82 g/ml | 0.99 g/ml |
| I.F.P. attrition | 6.1 % | 1.6 % |
| Crushing grain to grain | | |
| mini | 7.4 kg | 5.9 kg |
| maxi | 16.5 kg | 13.7 kg |
| average | 10.3 kg | 11.2 kg |

It is observed that the specific surface (measured with a sorbtometer) of each of these catalysts is considerably higher than that of the carrier used for the preparation of each of them, such as above indicated. For making clear the homogeneity of the catalysts of examples 1 and 3, they have been subjected to measurements with the microsonde of CASTAING.

The catalysts, placed after suitable treatment in a microsonde CAMECA MS 46, are inspected with an electronic sonde which explores the catalyst mass along a cylinder of about one micron diameter and 1.5 micron of height.

The excitation conditions are:

| Acceleration voltage | 20 kilovolts |
|---|---|
| Sonde intensity | 10 nanoamperes. |

The emission intensity of X rays, which characterizes the constituents of the catalyst, is measured with a Geiger meter; the spectral lines $K\alpha_1$ of iron, nickel and chromium are filtered by means of monochromators and their respective intensities are determined.

There is simultaneously measured for different travels on the surface of the sample, the intensity $i_{\cdot Ni}$, $i_{\cdot Fe}$ and $i_{\cdot Cr}$ of the spectral lines $K\alpha$ of X rays emission of these elements, expressed by the number of strokes per minute, in relation with the distance from the measuring point to the center of the sample.

For 50 points selected at random on these curves, there are measured $i_{\cdot Ni}$, $i_{\cdot Fe}$, $i_{\cdot Cr}$ and the following ratios are calculated:

$$a_1 = \frac{i_{\cdot Ni}}{i_{\cdot Fe}}, \quad a_2 = \frac{i_{\cdot Ni}}{i_{\cdot Cr}}, \quad a_3 = \frac{i_{\cdot Fe}}{i_{\cdot Cr}}.$$

There are then calculated the relative average values:

$$A_1 = \frac{\Sigma a_1}{50} \quad A_2 = \frac{\Sigma a_2}{50} \quad A_3 = \frac{\Sigma a_3}{50}$$

The maximal values of the ratios $a_1$, $a_2$ and $a_3$ : $a_{max(1)}$ $a_{max(2)}$ and $a_{max(3)}$ and the minimal values of the same ratios: $a_{min(1)}$, $a_{min(2)}$ and $a_{min(3)}$ are determined and the following differences are calculated: $\Delta a = (a \max - a \min)$, leading to the values $\Delta a_1$, $\Delta a_2$ and $\Delta a_3$.

In the following table III, there are given the values of the ratios $$\frac{\Delta a_1}{a_1}, \frac{\Delta a_2}{a_2} \text{ and } \frac{\Delta a_3}{a_3}$$

for the catalysts of examples 1 and 3.

TABLE III

| Catalyst | $\Delta a_1/A_1$ | $\Delta a_2/A_2$ | $\Delta a_3/A_3$ |
|---|---|---|---|
| Example 1 | 0.06 | 0.05 | 0.07 |
| Example 3 | 0.065 | 0.06 | 0.075 |

It is noticeable that all of these values are lower than 0.10.

The catalysts 1, 3, 4, 5, 7 and 8 have been furthermore subjected to an examination by X diffraction.

The samples, finely crushed, are placed in a LINDEMANN tube and analyzed in a DEBYE SHERRER chamber.

In addition to the spectral characteristics of the carrier ($Al_2O_3 \alpha$) there is observed that each of these samples selectively contains a cubic monophase of the spiral type, whose parameter $a_0$ has been determined.

The results are the following:

TABLE IV

| Catalyst | 1, 3 and 4 | 5 | 7 | 8 |
|---|---|---|---|---|
| $a_0$ (Angstroms) | 8.31$_1$ | 8.32$_2$ | 8.32$_0$ | 8.32$_4$ |

($a_0$ is determined at $\pm 0.005$ Å)

EXAMPLES 23 to 36

The conditions of preparation of the catalysts 23 to 34 are indicated in table V below.

The catalysts of examples 26 to 29 have been prepared from the catalysts of example 23 and the catalysts of examples 32 to 34 respectively from the catalysts of examples 31 and 33.

The catalysts of example 35 consists of a mixture comprising:
 80% by weight of the catalyst of example 23,
 15% by weight of the catalyst of example 25 and
 5% by weight of the catalyst of example 24.
The catalyst of example 36 comprises:
 90% by weight of the catalyst of example 17 and
 10% by weight of the catalyst of example 25.

TABLE V

| Ex. | CARRIER OR BASE CATALYST Reference | Mass (kg) | Impregnation Solution | Impregnation Amount (ml) | Impregnation Time (mn) | Drying T°C | Drying Time (h) | Thermal decomposition T°C | Thermal decomposition Time (h) | Mass (kg) | Resulting Catalyst active phase | Weight |
|---|---|---|---|---|---|---|---|---|---|---|---|---|
| 23 | SCS 9 | 100 | S | 47 000 | 60 | 200 | 24 | 500 | 2 | 112.5 | $Ni_{1.15}(Fe_{1/3}Cr_{2/3})_2O_4$ | 10 |
| 24 | SCS 9 | 2 | T | 850 +100 ml $H_2O$ | 10 | 150 | 2 | 500 | 2 | 2 | Ru | 0.046 |
| 25 | SCS 9 | 2 | U | 850 +100 ml $H_2O$ | 10 | 150 | 2 | 500 | 2 | 2 | Pd | 0.048 |
| 26 | Ex. 23 | 2 | T | 850 | 30 | 150 | 2 | 500 | 2 | 2 | $Ni_{1.15}(Fe_{1/3}Cr_{2/3})_2O_4$ + Ru | 10 / 10.046 |
| 27 | Ex. 23 | 2 | U | 850 | 30 | 150 | 2 | 500 | 2 | 2 | $Ni_{1.15}(Fe_{1/3}Cr_{2/3})_2O_4$ + Pd | 10 / 0.048 |
| 28 | Ex. 23 | 2 | V | 850 | 40 | 120 | 2 | 500 | 2 | 2 | $Ni_{1.15}(Fe_{1/3}Cr_{2/3})_2O_4$ + Rh | 10 / 0.045 |
| 29 | Ex. 23 | 2 | W | 850 | 50 | 170 | 1 | 500 | 2 | 2 | $Ni_{1.15}(Fe_{1/3}Cr_{2/3})_2O_4$ + Ir | 10 / 0.048 |
| 30 | $MgAl_2O_4$ | 3 | X | 900 | 20 | 200 | 18 | 500 | 2 | 3,4 | $Ni_1Fe_{1.2}Cr_{0.8}O_4$ + Pd | 10 |
| 31 | SCS 9 | 3 | Y | 1400 | 15 | 200 | 18 | 550 | 1½ | 3.4 | $Ni Fe_{1.6}Cr_{0.4}O_4$ | 10 |
| 32 | Ex. 31 | 3 | Z | 1200 | 50 | 120 | 4 | 500 | 2 | 3 | $Ni Fe_{1.6}Cr_{0.4}O_4$ + Pd + Ru | 10 / 0.035 / 0.005 |
| 33 | SCS 9 | 3 | AA | 1400 | 25 | 200 | 12 | 500 | 3 | 3.4 | $Ni Fe_{1.4}Cr_{0.6}O_4$ | 10 |
| 34 | Ex. 33 | 3 | AB | 1250 | 30 | 120 | 6 | 500 | 1½ | | $Ni Fe_{1.4}Cr_{0.6}O_4$ + Pd | 10 / 0.045 |

The catalysts prepared according to the examples 1 to 20 have been tested on a bench equipped with an engine of the type PEUGEOT 404, fed by injection with a gasoline without lead (SHELL super 4658).

The engine is adjusted to a running speed of 3000 rpm and the exhaust gases are collected from each cylinder outlet, admixed together and distributed to 4 catalytic boxes of one liter capacity each. The temperature measured in the catalyst bed is about 700° C and the gases pass through the latter at a volumetric hourly rate (VHR) of about 24,000 $h^{-1}$ (calculated as cold gases). The test consists of cycles of 20–22 hours of working, separated by cycles of 4–2 hours of cooling during which air can be optionally injected on the catalyst. The extreme limits of the content of the gases in polluting substances are:

[NO] = 1,600 – 2,600 ppm
   [CO] = 1.8 to 3.5%
   [Hydrocarbons] = 200 to 400 ppm.

During the test, numerous samples have been taken at the inlet and the outlet of the catalytic boxes, the determination of the polluting substances have been carried out by means of techniques and apparatuses as indicated hereinafter:

nitrogen oxides: DRAEGER tube and infrared analyzer "BECKMANN 315 A"
   $NH_3$: DRAEGER tube and absorption by a sulfuric solution (determination of $NH_4^+$ by photocolorimetry)
   CO: Infrared absorption Analyzer ONERA type 80
   hydrocarbons: Flame ionisation, Chromatograph PERKINELMER.

The results of these analyses, given in tables VI, VII and VIII hereinafter, show the performances of the catalysts:

There are given, after various operating times:
   the conversion (%) of nitrogen oxides
   the yield of nitrogen with respect to the initial nitrogen oxides NO content:

$$\frac{\text{total NO converted} - \text{NO converted to ammonia}}{\text{initial NO}}$$

the content of formed ammonia (ppm)
the conversion of carbon monoxide.

Table VI gives the results of the catalytic test carried out with catalysts 1 and 3.

Table VII gives the results of the catalytic test carried out on the catalysts 2 and 4 to 16.

Table VIII gives the results of the catalytic test carried out with the catalysts 17 to 20.

The catalysts of examples 21 and 22 have also been subjected to the above described catalytic test. Their initial activity, at various temperatures, has thus been determined. Table IX indicates the conversion of nitrogen oxides, the nitrogen yield, the amount of formed ammonia and the conversion of the carbon monoxide.

The behaviour to ageing of the activity of catalyst 22 at a temperature of 700° C has also been determined. The results are given in table X.

TABLE VI

| | CATALYST OF EXAMPLE 1 | | | | | | |
|---|---|---|---|---|---|---|---|
| Operating time (h) | 24 | 48 | 65 | 85 | 110 | 198 | 4–5 |
| NO conversion (%) | — | — | 93 | 91.8 | 92.7 | 91.2 | 86 |
| $N_2$ yield (%) | 87 | 83 | 85 | 84 | 83.2 | 84 | 81.4 |
| $NH_3$ content (ppm) | 125 | 270 | 170 | 170 | 220 | 140 | 110 |
| CO conversion (%) | 20 | 18 | 16.2 | 18 | — | — | — |

| | CATALYST OF EXAMPLE 3 | | | | | |
|---|---|---|---|---|---|---|
| Operating time (h) | 24 | 48 | 60 | 87 | 108 | 250 |
| NO conversion (%) | — | 90.2 | 90 | 86.4 | 85 | 83 |
| $N_2$ yield (%) | 94 | 88 | 88.3 | 85 | 84 | 82.8 |
| $NH_3$ content (ppm) | 60 | 45 | 30 | 25 | 25 | 10 |
| CO conversion (%) | 19 | 16 | 15 | 14 | — | — |

TABLE VII

| Catalyst | operating time (hours) | Conversion of NO (%) | Nitrogen yield (%) | Ammonia (ppm) | Carbon monoxide conversion (%) |
|---|---|---|---|---|---|
| 2 | 6 | 91 | 83 | 190 | 36 |
|   | 96 | 85 | 75 | 220 | 21 |
| 4 | 6 | 95 | 90 | 120 | 48 |
|   | 96 | 90 | 88 | 35 | 50 |
| 5 | 6 | 91 | 85 | 150 | 52 |
|   | 96 | 90 | 85 | 160 | 49 |
| 6 | 6 | 89 | 82 | 160 | 48 |
|   | 96 | 87 | 81 | 140 | 46 |
| 7 | 6 | 94 | 93 | 90 | 51 |
|   | 96 | 92 | 91 | 45 | 47 |
| 8 | 6 | 83 | 80 | 80 | 38 |
|   | 96 | 81 | 78 | 25 | 32 |
| 9 | 6 | 87 | 78 | 200 | 40 |
|   | 96 | 79 | 74 | 130 | 35 |
| 10 | 6 | 92 | 89 | 70 | 45 |
|    | 96 | 88 | 86 | 90 | 42 |
| 11 | 6 | 87 | 85 | 110 | 40 |
|    | 96 | 85 | 83 | 120 | 36 |
| 12 | 6 | 89 | 88 | 30 | 15 |
|    | 96 | 87 | 86 | 90 | 12 |
| 13 | 24 | 95 | 86 | 210 | — |
|    | 96 | 91 | 83 | 180 | — |
| 14 | 24 | 88 | 79.5 | 200 | — |
|    | 96 | 85 | 78 | 150 | — |
| 15 | 24 | 90 | 84 | 140 | — |
|    | 96 | 86 | 80 | 160 | — |
| 16 | 24 | 85 | 79 | 130 | — |
|    | 96 | 83 | 77 | 110 | — |

TABLE VIII

| Catalyst | Operating time (h) | NO conversion (%) | Nitrogen yield % | Ammonia ppm | Co conversion % |
|---|---|---|---|---|---|
| 17 | 24 | 95 | 84 | 250 | 48 |
|    | 450 | 86 | 80.5 | 120 | 20 |
| 18 | 24 | 95 | 82 | 300 | 52 |
|    | 450 | 85 | 80.5 | 100 | 19 |
| 19 | 24 | 95 | 83.5 | 260 | 46 |
|    | 450 | 87 | 81 | 130 | 22 |
| 20 | 24 | 95 | 82 | 300 | 50 |
|    | 450 | 84 | 77 | 150 | 21 |

TABLE IX

| Catalyst | Active phase | Wt % | Carrier | T(° C) | NO conversion (%) | Nitrogen yield (%) | $NH_3$ formed ppm | CC conversion (%) |
|---|---|---|---|---|---|---|---|---|
| 21 | $FeCr_2O_4$ | 10 | SRS 6 | 345 | ~ 0 | — | — | 2.5 |
|    |     |    |       | 492 | 72 | 46 | — | 34.5 |
|    |     |    |       | 570 | 91 | 24 | 1500 | 53.6 |
|    |     |    |       | 702 | 97 | 13 | 1300 | 54.2 |
| 22 | $NiCr_2O_4$ | 13 | SRS 6 | 480 | 7 | 3 | — | 8.3 |
|    |     |    |       | 612 | 98 | 75 | 510 | 41 |
|    |     |    |       | 740 | 99 | 89 | 200 | 45.8 |
|    |     |    |       | 642 | 95 | 80 | 300 | 22.2 |

TABLE X

| Operating Time (h) | 6 | 24 | 48 | 72 | 96 |
|---|---|---|---|---|---|
| NO conversion (%) | 99 | 66 | 50 | 25 | 24 |
| ppm $NH_3$ | 250 | 20 | 45 | 20 | 55 |

The catalysts of examples 17 and 23 to 36 have been tested on a vehicle: in the present case a PEUGEOT 204 Break vehicle equipped with a cylindrical catalytic box, having a diameter of 125 mm, a height of 122 mm and a capacity of 1.5 liter, placed at the output of the exhaust circuit. After respectively 1,000 and 20,000 km of test on the road, the vehicle is placed on a roll bench and the performances of the catalyst are determined according to the federal standard U.S. 1970 (Federal register Vol 33 No 108). The concentrations of nitrogen oxides and ammonia are recorded continuously and weighted for the totality of the cycle, according to the method described in the Standard for carbon monoxide and unburnt hydrocarbons.

Table XI gives the amounts of nitrogen oxides and ammonia generated after 1,000 and 20,000 km on the road. Without catalyst, the content by weight of nitrogen oxides amounted to $1,000 \pm 100$ ppm, with a richness of 1.06.

With fresh catalysts and after 20 000 km on the road, a laboratory test has been conducted with a VHR of 20 000 volumes of gas per volume of catalyst and per hour, over 20 ml of catalyst, in the presence of a gaseous mixture containing by volume 0.2 % of nitrogen oxides, 2% of carbon monoxide, 0.3% of oxygen, 3.3% of steam, 1% of hydrogen, the complement being nitrogen.

Table XI also gives the temperature (measured in the catalyst bed) necessary obtaining a total reduction of the nitrogen oxides to nitrogen and ammonia as well as the ammonia content measured at 500° C.

TABLE XI

| | | TEST ON VEHICLE | | |
|---|---|---|---|---|
| Catalyst of Ex. | Cata. age $NO_x$ (ppm) | 1 000 km $NH_3$ (ppm) | Cata. age $NO_x$ (ppm) | 20 000 km $NH_3$ (ppm) |
| 23 | 110 | 200 | 140 | 150 |
| 24 | 200 | 100 | 800 | 100 |
| 25 | 190 | 500 | 400 | 600 |
| 26 | 80 | 30 | 100 | 15 |
| 27 | 105 | 145 | 110 | 115 |
| 28 | 100 | 130 | 110 | 160 |
| 29 | 100 | 80 | 110 | 100 |
| 30 | 100 | 100 | 150 | 130 |
| 31 | 110 | 180 | 150 | 200 |
| 32 | 75 | 45 | 110 | 65 |
| 33 | 100 | 160 | 140 | 180 |
| 34 | 80 | 40 | 115 | 60 |
| 35 | 100 | 100 | 130 | 120 |
| 17 | 100 | 300 | 140 | 120 |
| 36 | 80 | 250 | 120 | 100 |

| | LABORATORY TEST | | | |
|---|---|---|---|---|
| | Fresh catalyst | | Catalyst after 20 000 km | |
| Catalyst of Ex. | T° C for NO = 0% | $NH_3$ ppm 500° C | T° C for NO = 0% | $NH_3$ ppm 500° C |
| 23 | 400 | 800 | 500 | 600 |
| 24 | 300 | 150 | >700 | 150 |
| 25 | 500 | 450 | 600 | 1000 |
| 26 | 200 | 100 | 330 | 75 |
| 27 | 250 | 190 | 350 | 180 |
| 28 | 240 | 150 | 360 | 200 |
| 29 | 230 | 100 | 360 | 150 |
| 30 | 280 | 120 | 550 | 180 |
| 31 | 350 | 600 | 530 | 600 |
| 32 | 250 | 110 | 350 | 150 |
| 33 | 360 | 500 | 520 | 600 |
| 34 | 245 | 130 | 380 | 150 |
| 35 | 310 | 250 | 450 | 300 |
| 17 | 240 | 800 | 500 | 200 |
| 36 | 220 | 300 | 400 | 150 |

What we claim as this invention is:

1. In a process for the reduction of nitrogen oxides present in a gaseous mixture containing said nitrogen oxides and a sufficient amount of reducing gas to reduce said nitrogen oxides, said process comprising contacting said gaseous mixture with a catalyst at about 200°–800° C, the improvement wherein said catalyst consists essentially of a carrier on which is deposited, in a proportion of from 3 to 20% of the catalyst weight, a dispersed, homogeneous active phase of mixed oxide of the formula $Ni_x(Fe_yCr_z)O_t$, x has a value from 0.85 to 1.30, the sum $(y+z)$ a value from 1.8 to 2.3, the ratio $$\frac{y}{y+z}$$

a value in the range of from 0.02:1 to 0.6:1 and $t$ is a positive value from 2 to 6, said active phase being deposited by impregnation of said mixed oxide in dissolved form, whereby said nitrogen oxides are substantially converted into molecular nitrogen.

2. A process according to claim 1, wherein the active phase amount is from 6 to 15% by weight of the catalyst.

3. A process according to claim 1, wherein the carrier is comprised mainly of alumina, and not more than substantially 10% of an oxide of an element selected from the group consisting of Mg, Ca, Ba and Li.

4. A process according to claim 1, wherein the carrier has a specific surface lower then 100 m²/g.

5. A process according to claim 4, wherein the carrier has a specific surface lower than 80 m²/g.

6. A process according to claim 5, wherein the carrier has a specific surface lower than 30 m²/g.

7. A process according to claim 1, said contacting being conducted at a rate of 20,000–60,000 volumes of gas per volume of catalyst per hour.

8. A process as defined by claim 1 wherein said gaseous mixture is an exhaust gas of an internal combustion engine and the reducing gas is selected from the group consisting of carbon monoxide, hydrogen and mixtures thereof.

9. A process as defined by claim 1 wherein said carrier consists essentially of alumina.

10. A process according to claim 1 wherein the homogeneity of the catalyst is such that the variations of the atomic ratios between the elements constituting the carrier and the active phase of the catalyst, as measured at the micron level, are lower than 10%.

11. A process according to claim 1, wherein the specific surface of the catalyst, after calcination, is at least equal to that of the carrier, after calcination, under the same conditions.

12. A process according to claim 1, said catalyst further consisting essentially of at least one additional metal element selected from the group consisting or ruthenium, rhodium, palladium, osmium, iridium and platinum, in a total amount of from 1 to 10,000 parts by weight per million of parts by weight of the catalyst.

13. A process according to claim 12, wherein the total amount of additional metal elements is from 10 to 1000 parts per million of parts per weight of said catalyst.

* * * * *